March 8, 1960 — W. L. PLUNKETT — 2,927,845
APPARATUS FOR MANUFACTURE OF NITROCELLULOSE
Filed May 15, 1956

WARREN L. PLUNKETT
INVENTOR.

BY Ernest G. Peterson
AGENT.

United States Patent Office 2,927,845
Patented Mar. 8, 1960

2,927,845
APPARATUS FOR MANUFACTURE OF NITROCELLULOSE

Warren L. Plunkett, Sayreville, N.J., assignor to Hercules Powder Company, Wilmington, Del., a corporation of Delaware Application May 15, 1956, Serial No. 584,957

8 Claims. (Cl. 23—285)

This invention relates to the manufacture of nitrocellulose and, more particularly, to an improved method and apparatus for the continuous nitration of cellulose.

Although various expedients for continuous nitration of cellulose have been proposed heretofore, it is a noteworthy fact that commercial nitration of cellulose is still substantially universally a batch process, even though batch nitration is recognized to have certain inherent disadvantages such as high manpower requirements, nonuniformity which necessarily accompanies small batch handling, and an inability to lend itself to automatic process control. Continuous cellulose nitration processes proposed heretofore have been deficient for various reasons, principally because they have proved to be unattractive economically in comparison to the well-established batch nitration process, and/or the nitrocellulose produced by such previously proposed continuous processes has been deficient in quality in comparison to nitrocellulose produced by the well-established batch process.

Accordingly, it is an object of this invention to provide an improved method and apparatus for continuous nitration of cellulose having great diversity for overcoming the deficiencies of prior art methods of cellulose nitration.

It is a further object of this invention to provide an improved method and apparatus for continuous nitration of cellulose which overcomes the major disadvantages of batch nitration in that manpower requirements are reduced, a more uniform nitration of the cellulose is afforded, and automatic process control is readily applicable.

Other objects of the invention will appear hereinafter, the novel features and combinations being set forth in the appended claims.

Generally described, the continuous manufacture of nitrocellulose in accordance with this invention comprises continuously bringing together separate streams of cellulose and nitrating mixture with agitation in a first reaction zone to form a slurry, continuously advancing the resulting slurry through a plurality of successive reaction zones in a continuous alternately descending and ascending stream to form nitrocellulose, continuously agitating the slurry in each descending and ascending portion of said stream to prevent segregation of solids from the slurry, and continuously withdrawing a slurry of nitrocellulose in spent nitrating mixture from the final reaction zone.

In practicing this invention, it is desirable to rapidly wet the charged cellulose with nitrating mixture to form a slurry in the first reaction zone, preferably by spraying the incoming cellulose stream with the nitrating mixture. In a preferred embodiment of the invention, hydraulic gradient is the only motivating force employed to advance the slurry through the succession of reaction zones, and residence time of the reaction slurry in the nitrator is controlled and regulated by adjusting the rate of introduction of the cellulose and nitrating mixture streams.

Improved apparatus for practicing continuous nitration of cellulose in accordance with this invention comprises in combination a horizontally elongated vessel to hold a reaction slurry of cellulose suspended in nitrating mixture, said vessel having a first series of weirs and a second series of weirs in alternate parallel-spaced relationship separating the interior of said vessel into a plurality of communicating reaction chambers from end to end thereof, said weirs forming common flat-walled partitions between adjacent communicating reaction chambers, each of said first weirs being in contact with both sides of the vessel and extending vertically downward from above the level of reaction slurry maintained in the vessel and terminating short of the bottom of the vessel to provide underflow communication between adjacent reaction chambers, each of said second weirs being in contact with the bottom and both sides of the vessel and extending vertically upward and terminating below the level of reaction slurry maintained in the vessel to provide overflow communication between adjacent reaction chambers, agitating means disposed in each reaction chamber, said vessel having a first charge means and a second charge means at one end thereof for introducing separate streams of cellulose and nitrating mixture, respectively, into the first of said communicating reaction chambers, and a discharge means at the other end thereof for withdrawing a slurry of nitrocellulose in spent nitrating mixture from the last of said communicating reaction chambers.

A preferred embodiment of the invention has been chosen for purposes of illustration and description and is shown in the accompanying drawing forming a part of the specification wherein reference symbols refer to like parts wherever they occur, and wherein valves, gages, and other auxiliary equipmenht have been omitted for the sake of simplicity.

Figure 1:
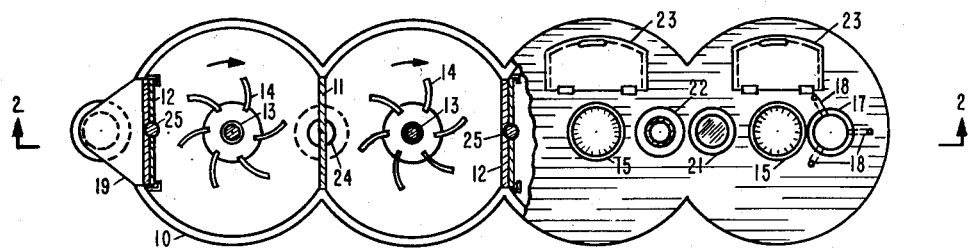
Fig. 1 is a plan view partly in section of the improved apparatus for continuous nitration of cellulose in accordance with this invention.

With reference to the figures, there is provided a horizontally elongated vessel 10 to hold a reaction slurry of cellulose suspended in nitrating mixture. Vessel 10 is provided with a first series of weirs 11 and a second series of weirs 12 in alternate parallel-spaced relationship separating the interior of vessel 10 into a plurality of communicating reaction chambers or zones A, B, C, and D from end to end thereof, weirs 11 and 12 forming common flat-walled partitions between adjacent communicating reaction chambers. Each of the first weirs 11 is in contact with both sides of vessel 10 and extends vertically downward from above the level of reaction slurry maintained in vessel 10 and terminates short of the bottom of vessel 10 to provide underflow communication between adjacent reaction chambers. Each of the second weirs 12 is in contact with the bottom and both sides of vessel 10 and extends vertically upward and terminates below the level of reaction slurry maintained in vessel 10 to provide overflow communication between adjacent reaction chambers.

An agitator shaft 13 is disposed in each of reaction chambers A, B, C, and D, and is provided with mixing blades 14 at a plurality of positions on each shaft for creating a plurality of intrastream circulations within the body of slurry in each reaction chamber to prevent segregation of solids from the reaction slurry, and to insure maintaining an intimate and uniform dispersion of the solids within the nitrating mixture. Driving means 15 operatively connected to the upper end of each agitator shaft 13 provide rotative power therefor, and a stabilizer or balancing ring 16 affixed adjacent the lower end of each shaft 13 minimizes shaft wobble during operation.

Vessel 10 is provided at one end thereof with a first charge means 17 for introducing cellulose and a second charge means 18 for introducing nitrating mixture into the first reaction chamber A, and a discharge means 19 at the other end thereof for withdrawing a slurry of nitrocellulose in spent nitrating mixture from the last reaction chamber D. Vessel 10 is also provided with sight glasses 21, fume exhaust tubes 22, manual access doors 23, and clean-out drains 24 which are disposed in the bottom of vessel 10 beneath each of the first weirs 11. In the embodiment illustrated, each of the second weirs 12 is adjustable in a vertical plane by means of threaded adjusting rods 25.

Figure 2:
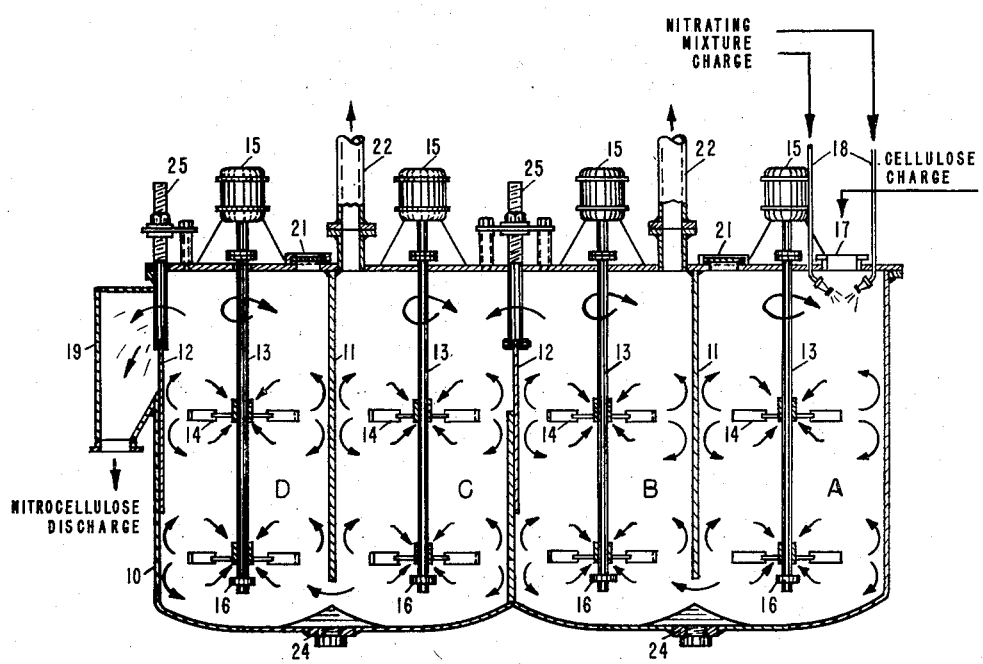
Fig. 2 is a vertical view in section taken along section 2—2 of Fig. 1.

According to a preferred method of operation, fresh nitrating mixture via second charge means 18 is continuously introduced into reaction chamber A at a predetermined rate. When the nitrating mixture has filled reaction chambers A and B to a level where it begins to flow over weir 12 into reaction chamber C, the agitators 13 in each of the reaction chambers are turned on, and cellulose via first charge means 17 is introduced continuously into reaction chamber A at a predetermined rate. In a preferred embodiment of the invention the cellulose upon entering reaction chamber A passes through a spray of nitrating mixture, introduced via second charge means 18, which rapidly wets the cellulose and forms a reaction slurry therewith. The agitated reaction slurry thus formed then advances continuously under the influence of hydraulic gradient successively through reaction chambers A, B, C, and D in a continuous alternately descending and ascending stream during which the nitrating mixture reacts with the cellulose to form nitrocellulose, and a slurry of nitrocellulose in spent nitrating mixture is continuously withdrawn via discharge means 19. With reference to Fig. 2 it will be apparent that the reaction slurry descends in reaction chamber A, passes under weir 11 into reaction chamber B where it ascends, flowing over weir 12 into reaction chamber C where it again descends and passes under weir 11 into reaction chamber D. The reaction slurry then ascends through reaction chamber D and overflows in a continuous stream over weir 12 into nitrocellulose discharge port 19. The operating level of reaction slurry in the nitrator is governed by the height at which weirs 12 are adjusted. Residence time of the reaction slurry in the nitrator is governed by the rate at which nitrating mixture and cellulose are introduced to the nitrating vessel, and sufficient residence time is provided to permit the nitration reaction to proceed to completion, the extent of nitration at equilibrium being governed primarily by the composition of the nitrating mixture.

The reaction slurry is agitated at a plurality of levels in each of the reaction chambers, and the degree of agitation is sufficient to maintain a uniform suspension of the solid cellulosic phase in the nitrating mixture, and prevent any segregation, settling out or channeling of the solid cellulosic phase in uninterrupted flow streams. The degree of agitation preferably should not be so vigorous as to cause splashing, or cause a breaking up or comminution of the cellulosic particles or fibers. The weirs 11 and 12 effectively prevent recirculation of the advancing agitated reaction slurry back into a preceding reaction chamber, and the agitated slurry advances positively through the nitrator under the influence of hydraulic gradient created by the incoming charge streams of cellulose and nitrating mixture.

The discharged stream of nitrocellulose suspended in spent nitrating mixture leaving the nitrator via discharge port 19 is then subjected to conventional processing involving separation of spent nitrating mixture from the nitrocellulose, followed by well-known treatment for stabilization, viscosity control, bleaching, dehydration, and the like, as necessary or desirable in the manufacture of nitrocellulose.

Whereas the geometrical configuration of the continuous nitrating apparatus, as illustrated in the drawing, has proved to be both economical to construct and very practical in use, the invention is by no means limited either with respect to geometric configuration of the nitrating apparatus or with respect to the number of communicating reaction chambers in the nitrating vessel. With respect to geometric configuration, in addition to the configuration illustrated, vessel 10 could be constructed to provide reaction chambers which are variously polygonal in cross-section, such as, rectangular, hexagonal, octagonal, decagonal, and the like. The reaction chamber bottoms, instead of being shallowly dished as illustrated, could be flat, or of other equivalent configuration which will not lead to substantial spaces or volumes incapable of being efficiently agitated, which would favor separation and settling out of solid cellulosic phase.

Instead of four reaction chambers as illustrated, the nitrating vessel can be constructed with 2, 6, 8, 10 or more communicating reaction chambers, as desired, and it is important to note that for a preselected residence time the throughput capacity of the nitrating apparatus of this invention increases with increasing number of reaction chambers, other factors in construction remaining constant. It is presently believed that a nitrating vessel having 6 reaction chambers in accordance with this invention represents the optimum.

It will be noted that weirs 11 are in contact with both sides of vessel 10 and extend vertically downward from above the level of reaction slurry maintained in the vessel and terminate short of the bottom of the vessel to provide underflow communication between adjacent reaction chambers. These weirs are imperforate and form common flat-wall partitions between adjacent communicating reaction chambers. Weirs 11 may be fixed or adjustable vertically as desired. The minimum size of the underflow communicating space provided by weirs 11 must be at least sufficient in cross-sectional area to permit underflow passage of the reaction slurry as rapidly as cellulose and nitrating mixture are introduced to the nitrating vessel without any appreciable holdup. Normally, however, these underflow communicating spaces will be somewhat larger in cross-section than the minimum, up to approximately half the cross-sectional area of one of the reaction chambers. Larger cross-sectional area than approximately half the cross-sectional area of one of the reaction chambers contributes no additional benefits, while complicating the agitation problem to prevent quiet unagitated areas or channeling into uninterrupted flow streams of only partly nitrated particles too rapidly through the nitrating vessel. By making these weirs adjustable vertically, it becomes a simple matter to control the cross-sectional areas of the underflow passages for optimum performance of the nitrator under various conditions of slurry consistency, agitation, and the like.

Weirs 12 are in contact with the bottom and both sides of vessel 10 and extend vertically upward and terminate below the level of reaction slurry maintained in the vessel to provide overflow communication between adjacent reaction chambers. Weirs 12, like weirs 11, are imperforate and form common flat-wall partitions between adjacent communicating reaction chambers. Preferably, weirs 12 are adjustable vertically; however, they may be made stationary, if desired. One of the purposes of weirs 12 is to adjust and regulate the height of reaction slurry in the nitrating vessel, and to control the hydraulic gradient which advances the reaction slurry through the several reaction chambers of the nitrating vessel.

An important function of both weirs 11 and weirs 12 is to prevent recirculation of advancing reaction slurry back into a preceding reaction chamber. Such recirculation is undesirable since it would lead to nonuniform holdup of nitrated cellulose with consequent nonuniformity in the product produced. Another important function of the flat-walled weirs 11 and 12 is to aid in creating and maintaining uniform mixing of the reaction slurry in all parts of the nitrating vessel. These weirs accomplish this by interrupting the centrifugal swirl set up by the agitator blades and causing the swirling slurry to roll over on itself and re-enter the vortex, thus promoting good mixing and avoiding channeling of material into uninterrupted flow streams adjacent to the side walls of the reaction chambers. Under certain circumstances, it may be found desirable to supplement the baffling action of the flat-walled weirs with additional baffles suitably disposed on the side walls of the reaction chambers.

In order to obtain a uniform nitrocellulose product, it is necessary by good mixing action to continuously maintain a uniform dispersion of cellulosic material in nitrating mixture in all parts of the nitrating vessel. Suitable agitators 13 disposed in each of the several communicating reaction chambers of the nitrating vessel are provided to accomplish this objective. The type of agitation provided promotes good mixing of the reaction slurry in all parts of the nitrating vessel without channeling of material into uninterrupted flow streams and without providing a propelling force tending to advance the reaction slurry without interruption through the several communicating reaction chambers of the nitrating vessel. A desirable form of agitation consists in creating a plurality of intrastream circulations in the reaction slurry in each of the several communicating reaction chambers of the nitrating vessel wherein efficient uniform mixing of the reaction slurry is accomplished without creation of uninterrupted flow streams.

Agitator shafts having open swept back turbine blades 14 affixed at two or more positions on each shaft, as illustrated, appear to be ideal for creating the type of agitation necessary for the purposes of this invention. However, the invention is not limited in this respect, since, in addition to turbine blades, paddle blades, propeller blades, and other forms of agitator blades can be employed, in various combinations, to provide the necessary mixing action to accomplish the purposes of this invention. Suitable combinations of agitating blades to obtain the necessary type of mixing action required by this invention will readily suggest themselves to anyone skilled in the art having a knowledge of the type of motion imparted to a liquid slurry by each particular type and form of agitating blade and a knowledge of the type of mixing and agitation required by this invention. When turbine blades are employed, it is important to note that the turbine blades at the lowermost position on each agitator shaft must be located in a horizontal plane above the lower termination of weirs 11 in order to operate properly. Propeller blades, if employed at the lowermost position on the agitator shafts, may, if desired, be disposed in a plane below the lower termination of weirs 11, and will operate properly when so located because of their inherent tendency to draw material into an axial vortex from one direction and propel it from the vortex in the opposite direction. Turbine blades, on the other hand, draw fluid into axial vortex both from above and below and expel fluid centrifugally at right angles to the axial vortex flow. It is a cardinal principle, of course, that propeller blades disposed at the lowermost position on the agitator shafts are always pitched to create a lifting motion to the fluid slurry.

Rotative power to operate the agitators may be derived from individual power sources such as a hydraulic or an electric motor operatively connected to each agitator shaft, or alternatively, operative power for all agitators may be derived from a single power source by employment of suitable power take-off devices such as pulleys, gears, and the like. It is highly desirable in accordance with a preferred embodiment of the invention to provide means for independent adjustment of the rate of rotation of each agitator. A very convenient means for accomplishing this objective is to provide a separate variable speed or multispeed motor for each agitator.

The rate of rotation of each agitator is adjusted to maintain uniform distribution of the solid cellulosic phase in the nitrating mixture without segregation or settling out of solids from the reaction slurry, and the degree of agitation required to accomplish this objective will depend on such factors as the physical form of the cellulose employed, the ratio of cellulose to nitrating mixture, and the type of agitating blades employed. Having adjusted the rate of rotation of the agitators to obtain good mixing sufficient to maintain uniform distribution of the solid cellulosic phase in the nitrating mixture, there is no advantage to be gained by increasing rate of rotation still further since this would involve an uneconomic expenditure of power and could lead to undesirable splashing of the reaction slurry or even to comminution of the cellulosic particles which is also undesirable.

The cellulose charge means 17 can be any suitable tube, pipe, chute, port or equivalent structure of sufficient cross-sectional area to accommodate uniform flow of the cellulose charge stream at the required rate without plugging up or bridging of the cellulose, and it is within the scope of this invention to employ more than one cellulose charge means when necessary or desirable.

The nitrating mixture charge means 18 can be one or a plurality of pipes or tubes having sufficient aggregate cross-sectional area to accommodate continuous and unimpeded introduction of the nitrating mixture at the required rate. Preferably the nitrating mixture charge means is provided with spray nozzles or equivalent delivery nozzles for breaking up the incoming charge stream of nitrating mixture into a spray. Since it is highly desirable to promote rapid wetting out of the cellulosic phase with formation of a reaction slurry of cellulose suspended in nitrating mixture, at least part of the charge stream of nitrating mixture should be sprayed or discharged directly onto and into the charge stream of cellulose. Accordingly, at least part of the aforementioned spray nozzles should desirably be disposed and oriented to direct a spray of nitrating mixture directly onto and into the charge stream of cellulose, and a convenient and practical arrangement to accomplish this involves employment of a plurality (any convenient number) of nitrating mixture charge means 18 disposed around the periphery of the cellulose charge means. It is to be understood, however, that the invention is not limited in this respect, for under certain circumstances it has been found desirable to introduce at least part of the nitrating mixture stream otherwise than by directing it directly onto and into the charge stream of cellulose. For example, with some types of cellulose charge there is a tendency for cellulose dust to collect on the exposed surfaces of the first reaction chamber A above the slurry level in said chamber. In such cases it is necessary to wash or bathe these area with at least a portion of the incoming nitrating mixture charge in order to keep cellulose dust from accumulating and keep these areas clean. This can be accomplished by disposing and orienting at least part of the nitrating mixture charge means 18, preferably provided with spray nozzles, to direct at least a portion of the incoming nitrating mixture charge onto the exposed surfaces of the first reaction chamber A above the slurry level in said chamber. As an alternative arrangement, instead of employing a plurality of nitrating mixture charge means, a single nitrating mixture pipe, tube, or equivalent port completely surrounding and concentrically spaced apart from the cellulose charge means to deliver a substantially continuous annular curtain of nitrating mixture around the periphery of the incoming cellulose charge stream can be employed, if desired.

The nitrocellulose discharge means 19 can be any conveniently shaped pipe, tube, chute, or similar discharge port of sufficient cross-sectional area to accommodate the slurry of nitrocellulose in spent nitrating mixture discharged from the final reaction chamber without impeding such discharge.

Any of the usual commercial forms of cellulose, such as cotton, purified cotton linters, purified wood pulp, regenerated cellulose, and the like can be employed in practicing this invention. The cellulose will be in bulk form such as picked linters, shredded wood pulp, fluffed bulk fibers, granules, finely ground or cut fibers, film shreds, and the like.

This invention contemplates the continuous formation of all commercial types of nitrocellulose embracing the entire range of useful nitrogen content. For this purpose, any of the known mixed acid compositions which have been employed to prepare nitrocellulose may be employed. For example, the nitrating mixture can be the usual mixed acids made up of various mixtures of nitric acid, sulfuric acid and water. Typical commercial nitrating acids and the nitrogen content of nitrocelluloses produced therefrom are set forth in Table 7 on page 722, Cellulose and Cellulose Derivatives, 2nd Edition, Part II, edited by Emil Ott and Harold M. Spurlin, Interscience Publishers, Inc., New York, copyright, 1954. Other typical nitrating mixtures involving mixtures of nitric acid, sulfuric acid and water appear in Table 5, page 719, and in Table 6, page 720, of the above cited text on Cellulose and Cellulose Derivatives.

Within these tables there are listed various nitrating mixtures for preparing any particular nitrocellulose desired. Likewise, within these tables there are listed nitrating mixtures suitable for preparing substantially all commercial types of nitrocellulose. For certain purposes, when desirable, the sulfuric acid in such mixed acids can be replaced with phosphoric acid, phosphorous pentoxide, or acetic anhydride as the dehydrating agent.

Alternatively, the nitrating mixtures of this invention may be various mixtures of nitric acid, magnesium nitrate and water, the ratio of magnesium nitrate to water being at least about 1.2:1 and not more than about 2.2:1 by weight and said nitric acid being present in an amount sufficient to yield a nitric acid ester of cellulose having a nitrogen content of from about 11% to about 13.5% by weight. More particularly, such nitrating mixtures will contain essentially between about 45% and about 94% nitric acid, between about 3.3% and about 34% magnesium nitrate, and between about 2.7% and about 21% water by weight, the ratio of magnesium nitrate to water being at least about 1.2:1 and not more than about 2.2:1. It will be understood, of course, that the sum of the three essential components will constitute substantially 100% of the nitrating mixture, any $N_2O_3$ being only an incidental ingredient in the nitrating mixture, since it is well recognized that concentrated nitric acid often contains small percentages of $N_2O_3$, usually on the order of 0.1% or less. Within the aforestated limits are various nitrating mixtures for preparing any particular nitrocellulose desired, as well as nitrating mixtures suitable for preparing substantially all commercial types of nitrocellulose. The particular nitrating mixture employed will, therefore, be largely a matter of choice governed by economic and end use considerations, it being apparent that the higher nitrogen-type nitrocelluloses require nitrating mixtures high in nitric acid content and low in water content within the limits set forth. The following table lists some typical nitrating mixtures containing essentially nitric acid, magnesium nitrate and water, together with the nitrogen content of nitrocellulose produced therefrom.

TABLE

| Example | Nitrating Mixture Composition, Percent by Weight | | | | Percent Nitrogen In Nitrocellulose Produced |
|---|---|---|---|---|---|
| | Nitric Acid | Magnesium Nitrate | Water | $N_2O_3$ | |
| 1 | 60.00 | 23.30 | 16.70 | | 11.05 |
| 2 | 56.00 | 27.30 | 16.70 | | 11.76 |
| 3 | 50.00 | 31.72 | 18.28 | | 11.91 |
| 4 | 60.00 | 24.40 | 15.70 | | 11.95 |
| 5 | 54.00 | 29.00 | 17.00 | | 12.16 |
| 6 | 50.00 | 32.70 | 17.30 | | 12.26 |
| 7 | 67.30 | 19.27 | 13.41 | 0.02 | 12.37 |
| 8 | 69.73 | 18.12 | 12.13 | 0.02 | 12.57 |
| 9 | 58.91 | 27.45 | 13.63 | 0.01 | 12.87 |
| 10 | 69.74 | 20.00 | 10.24 | 0.02 | 13.23 |
| 11 | 75.20 | 15.80 | 9.00 | | 13.39 |
| 12 | 89.33 | 5.78 | 4.75 | 0.14 | 13.36 |
| 13 | 84.80 | 9.13 | 6.00 | 0.07 | 13.57 |
| 14 | 79.76 | 11.84 | 8.37 | 0.03 | 12.59 |
| 15 | 93.62 | 3.63 | 2.65 | 0.10 | 12.76 |
| 16 | 90.47 | 5.56 | 3.92 | 0.05 | 13.46 |

The quantity of nitrating mixture employed per part of cellulose in accordance with this invention is sufficient to form a fluid, stirrable slurry therewith, which slurry will flow under the influence of an hydraulic gradient applied to the slurry and which can be agitated to form and maintain a uniform dispersion of cellulose in nitrating mixture. This is the minimum operable quantity, and will vary depending upon the physical form of the cellulose charge employed. For example, dense fibrous granules of cellulose can be readily slurried with as little as 6 parts nitrating mixture to 1 part cellulose by weight. Wood pulp shredded by the method set forth in U.S. Patent 2,028,080 to Stern normally requires about 22 parts nitrating mixture to 1 part of cellulose by weight. On the other hand, wood pulp dry fluffed in an Osterizer, and known in the art as Bauer Dry Fluffed wood pulp, normally requires about 50 parts nitrating mixture to 1 part of cellulose by weight, while wood pulp wet shredded in an Osterizer, and known in the art as Brown Wet Shredded wood pulp, normally requires about 45 parts nitrating mixture to 1 part cellulose by weight. Picked cotton linters normally require about 39 parts nitrating mixture to 1 part of cellulose by weight to form a suitable slurry which can be readily agitated to form and maintain a uniform dispersion of cellulose in nitrating mixture, and which will nitrate to form a uniformly substituted nitrocellulose having desirable solubility characteristics. It will be apparent, of course, that larger quantities of nitrating mixtures can be employed, such as 50 parts, 75 parts, or even 100 parts per part of cellulose, when desired. However, the economics and practical aspects of the system will usually govern the ratio of nitrating mixture to cellulose, it being most economical and practical to nitrate with the lowest ratio that will produce a uniform, high quality nitrocellulose. It should be pointed out, of course, that even 6 parts nitrating mixture to 1 part cellulose represents an excess of nitrating capacity over theoretical stoichiometric requirements to form nitrocellulose.

Successful practice of this invention requires bringing together the separate streams of cellulose and nitrating mixture in a first reaction zone with agitation to form a slurry and maintaining a uniform dispersion of the cellulosic phase in the nitrating mixture throughout the course of the nitration reaction. In forming the slurry of cellulose in nitrating mixture, it is highly desirable to wet out the cellulose with nitrating mixture and disperse the cellulose uniformly through the nitrating mixture as rapidly as possible. In practice this objective has been accomplished by spraying the incoming cellulose charge stream with the incoming nitrating mixture charge stream, and by providing a more vigorous agitation in the first reaction chamber A, than needs to be applied in successive reaction chambers to maintain uniform dispersion of cellulosic phase in the nitrating mixture. For example, in a typical run employing a nitrating vessel having 4 communicating reaction chambers and employing open swept back turbine blades, as illustrated, with wood pulp shredded in accordance with U.S. Patent 2,028,080 to Stern as the cellulosic charge, and employing 26 parts nitrating mixture to 1 part cellulose by weight, the agitators in the first reaction chamber A were rotated at 100 r.p.m., in reaction chamber B at 95 r.p.m., and in each of reaction chambers C and D at 65 r.p.m.

The rate of introduction of the cellulose stream and the rate of introduction of the nitrating mixture stream is each adjusted to maintain the proper ratio with respect to each other to form a suitable reaction slurry, and to provide sufficient residence time of the reaction slurry in the nitrating vessel to permit the nitration reaction to proceed to completion, the extent of nitration at equilibrium being governed primarily by the composition of the nitrating mixture. With nitrating mixtures consisting of mixtures of nitric acid, sulfuric acid and water, it has been established that nitration is substantially complete in about 18 minutes. Nitration with mixtures of nitric acid, magnesium nitrate and water has been found to be substantially complete within 10 minutes. Knowing these facts, it is a simple matter to adjust the rates of introduction of cellulose and nitrating mixture so that the elapsed time between initial introduction of charge streams and initial discharge of this same material from the nitrating vessel, and thus residence time in the nitrating vessel, is at least sufficient to permit the nitration reaction to proceed to completion. Analysis of the discharged nitrocellulose for nitrogen content, and observation of the solubility characteristics of the nitrocellulose provide an ample check on whether sufficient residence time has been provided. If the nitrogen content of the discharged nitrocellulose closely approaches the calculated nitrogen content expected from the nitrating mixture employed, and the discharged nitrocellulose dissolves substantially completely in test solvents to form clear, smooth solutions substantially free of undissolved fibers or particles, it can be concluded that residence time in the nitrating vessel has been sufficient to permit the nitration reaction to go to completion.

A wide range of temperatures can be employed in practicing this invention. For practical reasons, however, it is not desirable to employ temperatures below about 15° C. or higher than about 70° C. Below about 15° C. the reaction becomes too slow to be economically attractive, and above 70° C. the nitrocellulose tends to decompose. A preferred range of temperatures lies between about 20° C. and about 50° C. These temperatures are readily attained by heating the nitrating mixture to the desired temperature prior to introduction into the nitrating vessel. Ordinarily, heat exchange facilities, such as vessel jacketing, is not necessary in order to maintain the desired reaction temperature, since the heat of reaction absorbed by the relatively large volume of nitrating mixture employed just about balances out heat lost from the nitrating vessel by conduction, radiation, and other means. However, it is within the scope of this invention to employ heating or cooling means, such as vessel jacketing or equivalent means, when necessary or desirable, to maintain reaction temperatures at any predetermined desirable level, or within any predetermined temperature range.

The nitrating apparatus in accordance with this invention should be constructed of metal which is resistant to corrosion by the nitrating mixtures employed. Ordinary carbon steels will suffice when employing mixtures of nitric acid, sulfuric acid and water. However, mixtures of nitric acid, magnesium nitrate and water dictate employment of stainless steel equipment to avoid excessive corrosion.

The following examples set forth specific embodiments of the invention. It is to be understood, however, that these examples, while illustrative, are not to be construed as a limitation of the invention.

*Example 1*

In this example the nitrating vessel was constructed as illustrated in the drawing with 4 communicating reaction chambers each approximately 3 feet in diameter and 5 feet deep. The openings in the underflow weirs 11 were each approximately 100 square inches. The agitators in reaction chamber A were 2 six-bladed open swept back turbines 21.7 inches in diameter with blades approximately 5¾ inches wide. The lower turbine was located approximately 16 inches from the bottom of the reaction chamber, and the upper turbine was located 24 inches above the lower turbine. The agitators in reaction chambers B, C and D were six-bladed open swept back turbines 20 inches in diameter with blades approximately 3¾ inches wide. Two such turbines were disposed in each of reaction chambers B, C and D, with the lower turbine 16 inches from the bottom of the chamber and the upper turbine 24 inches above the lower turbine.

The cellulose charge port 17 was approximately 10 inches in diameter, and the nitrating mixture charge means 18 consisted of 4 fishtail spray nozzles disposed at 90° intervals around the periphery of the cellulose charge port.

With the agitators off, nitrating mixture preheated to 44° C. was started into reaction chamber A through the fishtail nozzles at a rate of 25 gallons per minute. When reaction chambers A and B were filled with nitrating mixture to the operating level, and nitrating mixture commenced flowing over weir 12 into reaction chamber C, the agitator in reaction chamber A was started and adjusted to rotate at 100 r.p.m. The cellulose feed, shredded wood pulp, was then started into reaction chamber A at a rate of 12.9 pounds per minute, thus making the ratio of nitrating mixture to cellulose of 26 to 1 by weight. Four minutes after initially starting the cellulose feed, the agitator in reaction chamber B was started and adjusted to rotate at 95 r.p.m. Four minutes later the agitators in reaction chambers C and D were started and adjusted to rotate at 65 r.p.m. The unit was then on stream, and the overflow weirs were adjusted to provide an overall hydraulic gradient between the level of slurry in reaction chamber A and the overflow into nitrocellulose discharge port 19 of about 8 inches, thus providing for a drop of about 2 inches in the slurry level in each succeeding reaction chamber. The running heads over the overflow weirs was about 1 inch deep. This adjustment provided a residence time of charged material in the nitrating vessel of about 18 minutes. Operation was continuous with no plug-ups or settling out or segregation of cellulosic phase anywhere in the nitrating vessel. Mixing was excellent in all reaction chambers with substantially uniform dispersion of the cellulosic phase being maintained throughout all parts of the nitrating vessel.

The nitrocellulose produced had a nitrogen content of 12.1%. A 12.2% by weight test solution of this nitrocellulose dissolved in a solvent composed of 55% toluene, 20% ethyl acetate and 25% ethyl alcohol, by weight, was smooth and sparkling clear, and free of any undissolved particles or fibers, thus demonstrating that the nitrocellulose produced was quite satisfactorily uniform. The viscosity of this test solution at 25° C. by the standard ASTM falling ball method was 330 seconds. This nitrocellulose after subsequent treatment involving wringing, drowning, washing, purification, digestion and dehydration was suitable for use in all applications wherein a standard RS ½ second type nitrocellulose is required.

The nitrating mixture employed in this example had the following composition:

Nitrating mixture composition: Percent by weight
- Nitric acid _____ 43.40
- Sulfuric acid _____ 36.40
- Water _____ 15.60
- Oxide content expressed as HNOSO₄ _____ 4.60

*Example 2*

Substantially the same apparatus and procedure as set forth in Example 1 were employed in this example. Pertinent data with respect to nitrating mixture composition, cellulose feed stock, temperature, feed rates, residence time, agitator speeds, and product characteristics follow:

Nitrating mixture composition:
- Nitric acid _____ 24.90% by weight.
- Sulfuric acid _____ 50.50% by weight.
- Water _____ 16.05% by weight.
- Oxide content expressed as HNOSO₄ _____ 8.55% by weight.

Cellulose type _____ Picked linters.
Temperature _____ 40° C.
Cellulose feed rate _____ 13.72 pounds per minute.
Nitrating mixture feed rate _____ 40 gallons per minute.
Ratio nitrating mixture to cellulose. 39 to 1 by weight.
Residence time in nitrator _____ Approximately 18 minutes.

Agitator speeds:
- Reaction chamber A _____ 155 r.p.m.
- Reaction chamber B _____ 155 r.p.m.
- Reaction chamber C _____ 155 r.p.m.
- Reaction chamber D _____ 70 r.p.m.

Percent nitrogen in nitrocellulose __ 12.23% by weight.
Nitrocellulose viscosity (ASTM falling ball) _____ 760 seconds.
Solution appearance _____ Clear, smooth, free of undissolved particles or fibers.

*Example 3*

Substantially the same apparatus and procedure as set forth in Example 1 were employed in this example. Pertinent data with respect to nitrating mixture, cellulose employed, temperature, feed rates, residence time, agitator speeds, and product characteristics follow:

Nitrating mixture composition:
- Nitric acid _____ 43.40% by weight.
- Sulfuric acid _____ 36.16% by weight.
- Water _____ 14.90% by weight.
- Oxide content expressed as HNOSO₄ _____ 5.54% by weight.

Cellulose type _____ Shredded wood pulp.
Temperature _____ 44° C.
Cellulose feed rate _____ 23.20 pounds per minute.
Nitrating mixture feed rate _____ 49.5 gallons per minute.
Ratio nitrating mixture to cellulose _____ 27 to 1 by weight.
Residence time _____ Approximately 18 minutes.

Agitator speeds:
- Reaction chamber A _____ 120 r.p.m.
- Reaction chamber B _____ 155 r.p.m.
- Reaction chamber C _____ 155 r.p.m.
- Reaction chamber D _____ 45 r.p.m.

Percent nitrogen in nitrocellulose __ 12.03% by weight.
Nitrocellulose viscosity (ASTM falling ball) _____ 650 seconds.
Solution appearance _____ Clear, smooth, free of undissolved particles or fibers.

It is evident from the foregoing description that this invention provides an eminently satisfactory method and apparatus for the continuous nitration of cellulose, having distinct advantages over prior art apparatus and methods of nitration. Among the advantages realized by practice of this invention is a marked reduction in manpower requirements, a more uniform processing of the reactants with consequent better uniformity in the resultant nitrocellulose, an ability to handle more concentrated reaction slurries than has been possible heretofore, and the process and apparatus lend themselves readily to automatic control.

What I claim and desire to protect by Letters Patent is:

1. Apparatus especially suitable for the continuous manufacture of nitrocellulose comprising a vessel separated by partitions into at least four horizontally disposed, communicating reaction chambers, the chamber at one end of the vessel having charge means adjacent the top thereof for introducing cellulose and nitrating acid into said chamber to form therein a reaction slurry of cellulose in nitrating acid, and the chamber at the other end of said vessel having a discharge port in the outer wall thereof for withdrawing a slurry of nitrocellulose in spent nitrating acid, said partitions between said reaction chambers being imperforate, flat-walled, alternating first series and second series weirs, said first series weirs being in contact with both sides of the vessel and extending vertically downward from the top of the vessel and terminating short of the bottom of the vessel to provide underflow communication between adjacent reaction chambers, said second series weirs being in contact with the bottom and both sides of the vessel and extending vertically upward and terminating below the top of the vessel to provide overflow communication between adjacent reaction chambers, the first of said second series weirs in the direction of flow of reaction slurry through the vessel terminating at a level below said charge means and each of said second series weirs after said first second series weir terminating at a lower level than the immediately preceding second series weir, and the bottom of said discharge port being lower than the immediately preceding second series weir to provide a descending, cascading hydraulic gradient along the length of the vessel, and agitating means disposed in each reaction chamber solely for maintaining a uniform slurry of cellulosic phase in the nitrating acid without imparting a propelling force to advance the reaction slurry from one reaction chamber to the next, said descending, cascading hydraulic gradient being the sole motivating force to advance the reaction slurry through the vessel.

2. Apparatus according to claim 1 wherein the bottoms of said first weirs are adjustable in a vertical plane.

3. Apparatus according to claim 1 wherein the tops of said second series weirs and the bottom of said discharge port are adjustable in a vertical plane.

4. Apparatus according to claim 1 having at least six communicating reaction chambers.

5. Apparatus especially suitable for the continuous manufacture of nitrocellulose comprising a vessel separated by partitions into at least four horizontally disposed, communicating reaction chambers, the chamber at one end of the vessel having charge means adjacent the top thereof for introducing cellulose and nitrating acid into said chamber to form therein a reaction slurry of cellulose in nitrating acid, and the chamber at the other end of said vessel having a discharge port in the outer wall thereof for withdrawing a slurry of nitrocellulose in spent nitrating acid, said partitions being imperforate, flat-walled, alternating first series and second series weirs, said first series weirs being in contact with both sides of the vessel and extending vertically downward from the top of the vessel and terminating short of the bottom of the vessel to provide underflow communication between adjacent reaction chambers, said second series weirs being in contact with the bottom and both sides of the vessel and extending vertically upward and terminating below the top of the vessel to provide overflow communication between adjacent reaction chambers, the first of said second series weirs in the direction of flow of reaction slurry through the vessel terminating at a level below said charge means and each of said second series weirs after said first second series weir terminating at a lower level than the immediately preceding second series weir, and the bottom of said discharge port being lower than the immediately preceding second series weir to provide a descending, cascading hydraulic gradient along the length of the vessel, agitator shafts disposed in each reaction chamber, each of said shafts having mixing blades without pitch at a plurality of positions thereon solely for maintaining a uniform slurry of cellulosic phase in the nitrating acid without imparting a propelling force to advance the reaction slurry from one reaction chamber to the next, and means for rotating said agitator shafts, said hydraulic gradient being the sole motivating force to advance the reaction slurry through the vessel.

6. Apparatus according to claim 5 wherein each agitator shaft is provided with open swept back turbine blades in at least two positions on said shaft and wherein the rate of rotation of each shaft is independently adjustable.

7. Apparatus according to claim 5 wherein the chamber at the charge end of the vessel has a first charge means and a second charge means adjacent the top thereof for introducing separate streams of cellulose and nitrating acid, respectively, into said chamber, said second charge means being a plurality of liquid nozzles disposed to discharge nitrating mixture into the stream of entering cellulose to rapidly wet same and form a slurry.

8. Apparatus according to claim 5 wherein the chamber at the charge end of the vessel has a first charge means and a second charge means adjacent the top thereof for introducing separate streams of cellulose and nitrating acid, respectively, into said chamber, said second charge means being a plurality of liquid nozzles, at least part of said nozzles being disposed to discharge nitrating acid into the stream of entering cellulose and at least part of said nozzles being disposed to discharge nitrating acid onto the exposed surfaces of said chamber above the reaction slurry therein.

References Cited in the file of this patent

UNITED STATES PATENTS

| | | |
|---|---|---|
| 638,647 | Selwig | Dec. 5, 1899 |
| 1,415,105 | Moffat | May 9, 1922 |
| 2,073,148 | Gayford et al. | Mar. 9, 1937 |
| 2,103,593 | Milliken | Dec. 28, 1937 |
| 2,445,741 | Franz et al. | July 20, 1948 |
| 2,494,602 | Wright | Jan. 17, 1950 |
| 2,678,310 | Brooks | May 11, 1954 |
| 2,679,982 | Thyle | June 1, 1954 |
| 2,743,999 | Binswanger | May 1, 1956 |
| 2,776,966 | McMillan et al. | Jan. 8, 1957 |